United States Patent [19]

Gordon

[11] Patent Number: 4,675,065

[45] Date of Patent: Jun. 23, 1987

[54] METHOD FOR SECURING A MICROSIEVE TO A SUPPORT MEMBER

[75] Inventor: Richard E. Gordon, Westfield, N.J.

[73] Assignee: Bar Ilan University, Ramat Gan, Israel

[21] Appl. No.: 771,326

[22] Filed: Aug. 30, 1985

[51] Int. Cl.⁴ .................. B32B 31/04; B32B 31/28
[52] U.S. Cl. ................. 156/272.8; 156/275.1;
156/293; 156/303.1; 156/308.4; 156/309.6;
219/121 LD; 219/121 LF; 219/121 LS;
219/121 LY
[58] Field of Search .......... 156/73.2, 88, 272.8,
156/275.1, 275.3, 293, 298, 303.1, 308.2, 308.4,
309.6; 219/121 LC, 121 LD, 121 LE, 121 LF,
121 LY, 121 LS, 121 LT

[56] References Cited

U.S. PATENT DOCUMENTS

| | | | |
|---|---|---|---|
| 3,594,261 | 7/1971 | Broerman | 156/272.8 |
| 3,806,386 | 4/1974 | Burke | 156/73.1 |
| 3,974,016 | 8/1976 | Bondybey et al. | 156/272.8 |
| 3,997,385 | 12/1976 | Osborne | 156/272.8 |
| 4,029,535 | 6/1977 | Cannon et al. | 156/272.8 |
| 4,069,080 | 1/1978 | Osborne | 156/272.8 |
| 4,224,096 | 9/1980 | Osborne | 156/272.8 |
| 4,418,906 | 12/1983 | Scott | 271/99 |
| 4,461,945 | 7/1984 | O'Cheskey | 219/121 LC |
| 4,461,947 | 7/1984 | Ward | 219/121 LC |
| 4,534,819 | 8/1985 | Payet | 156/267 |

FOREIGN PATENT DOCUMENTS 833141 1/1984 South Africa .

*Primary Examiner*—Donald E. Czaja
*Assistant Examiner*—Merrell C. Cashion, Jr.
*Attorney, Agent, or Firm*—Vincent P. Pirri; Peter G. Dilworth

[57] ABSTRACT

A method is provided for securing a metallic microsieve which comprises;
(a) inserting a metallic microsieve within the well of a frame-like support member, at least a portion of the upper edge of the well being fabricated from a fusible material and the height of the well wall being greater than the thickness of the microsieve;
(b) directing a laser beam against a point on the upper edge of the well to melt fusible material in contact with the laser beam;
(c) permitting the laser-molten fusible material to travel down the wall of the well and contact the edge of the microsieve; and,
(d) permitting the laser-molten fusible material in contact with the edge of the microsieve solidify thereby forming a retaining member which secures the microsieve to the support member.

17 Claims, 5 Drawing Figures

METHOD FOR SECURING A MICROSIEVE TO A SUPPORT MEMBER

BACKGROUND OF THE INVENTION

This invention relates to a method for securing an extremely thin metal structure possessing a grid-like array of minute, closely spaced, precisely dimensioned apertures to a support member or carrier and the resulting supported microsieve.

Such an apertured metal structure, hereinafter referred to as a "microsieve", is especially useful in sorting and sieving objects of only a few microns in size. One such microsieve, designated a "cell carrier", is described in Spanish Pat. No. 522,207, granted June 1, 1984, and in commonly assigned, copending U.S. patent application Ser. No. 550,233, filed Nov. 8, 1983, the disclosure of which is incorporated by reference herein, for classifying biological cells by size. The cell carrier is prepared employing a modified photofabrication technique of the type used in the manufacture of transmission electron microscope grids. The cell carrier is on the order of only a few microns in thickness and possesses a numerically dense pattern of minute apertures. Even with the exercise of great care, the very delicate nature of the cell carrier makes it difficult to manipulate, for example, to insert it in a holder of the type shown in aforesaid U.S. patent application Ser. No. 550,233, without causing it appreciable damage, frequently in the form of a structural deflection or deformation which renders it useless for its intended use.

Laser-welding is a known technique for selectively fusing adjacent surfaces of the same, e.g., thermoplastic, material. Reference may be had in this respect to the disclosures of U.S. Pat. Nos. 3,974,016; 4,029,535; 4,069,080; 4,224,096; and, 4,461,947.

SUMMARY OF THE INVENTION

It is an object of the present invention to provide a method and means for securing a metallic microsieve to a fusible support member.

It is another object of the invention to provide a laser procedure for securing a metallic microsieve to a fusible support member.

It is still a further object of the invention to provide a metal microsieve which is secured within a well defined within a support means with a precise planar disposition of the microsieve within the well.

These and other objects of the invention are readily achieved by the method for securing a metallic microsieve to a support member which comprises:

(a) inserting a metallic microsieve within the well of a frame-like support member, at least a part of the upper edge of the well being fabricated from a fusible material and the height of the well wall being greater than the thickness of the microsieve;

(b) directing a laser beam against a point on the upper edge of the well to melt fusible material in contact with the laser beam;

(c) permitting the laser-molten fusible material to flow down the wall of the well and contact the edge of the microsieve; and, (d) permitting the laser-molten fusible material in contact with the edge of the microsieve to solidify thereby forming a retaining member which secures the microsieve to the support.

Employing the foregoing method, it is possible to securely mount a very delicate metallic microsieve within its holder without disturbing the planar disposition of the microsieve and without subjecting the microsieve to any appreciable damage which would interfere with or even destroy its proper functioning.

DESCRIPTION OF THE PREFERRED EMBODIMENTS

Figure 1A:
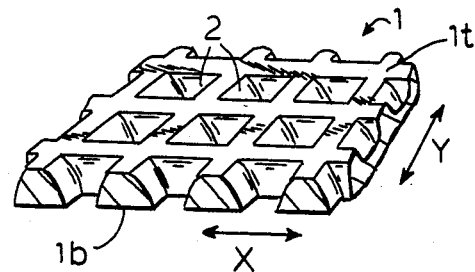
FIGS. 1(a) and 1(b) are illustrations, the first in perspective view and the second in side elevational view, greatly enlarged and with certain features exaggerated for the sake of clarity, of a typical portion of a microsieve which can be secured to a support member in accordance with the present invention; and, FIGS. 2(a), (b) and (c) are side elevational views, also greatly enlarged and in certain respects, exaggerated, of the method and means of securing a microsieve to a support member in accordance with this invention and the resulting supported microsieve.
Figure 1B:
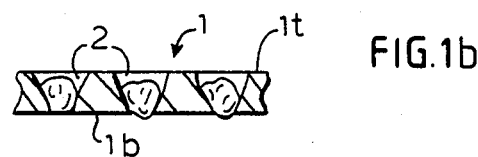

As shown in FIGS. 1(a) and 1(b), a representative section 1 of a known type of microsieve which is adapted for use as a biological cell carrier possesses numerous closely spaced apertures 2 arranged in a matrix-like pattern of rows and columns along axes X and Y, respectively. This arrangement makes it possible to unambiguously identify the position of any one aperture in terms of its X and Y coordinates in the plane of the carrier. The number of apertures is selected with the number of biological cells to be carried in mind. For example, with 100 apertures per row and column, there will be provided a total of 10,000 apertures to carry up to 10,000 cells. Microsieve 1 can be round, square, rectangular, etc., in configuration and can be fabricated from any suitable material, for example, a metal such as copper, gold, nickel, silver, etc., or metal alloy. The shape of apertures 2 enables biological cells of preselected dimensions to be effectively held to the microsieve by applying means, such as a pressure difference between the upper and the bottom side of the carrier, or electromagnetic forces. To first separate a particular group of cells from cells of other groups, microsieve 1 is chosen to have apertures of sizes so that when the matter, for example, blood, containing the various cell groups is placed thereon most, if not all, of the apertures become occupied by cells of the group of interest with each aperture containing one such cell. Thus, the apertures can be sized to receive, say, lymphocytes of which there are two principal sizes, namely, those of 7 microns and those of 10–15 microns, with the former being the cells of particular interest. To capture and retain the smaller size lymphocytes at the upper surface or side 1$t$ of microsieve 1, apertures 2 will have a cross-sectional diameter of about 6 micrometers. In this way, a lymphocyte from the desired population of cells can easily enter an aperture but once it has occupied the aperture, it cannot pass out of the bottom 1$b$ of the microsieve.

The dimensions of microsieve 1 are necessarily very fine, both the width and depth of apertures 2 being on the order of only a few microns. Consequently, the microsieve is extremely delicate and vulnerable to damage employing conventional tools/equipment to place it in, and secure it to, its associated holder.

Figure 2A:
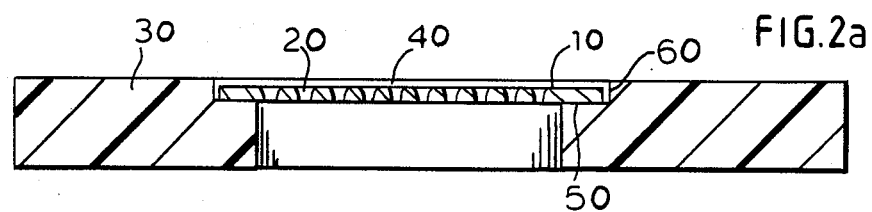

The present invention is illustrated in the side elevational views of FIGS. 2(a), (b) and (c) illustrating the various steps of the method.

Figure 2B:
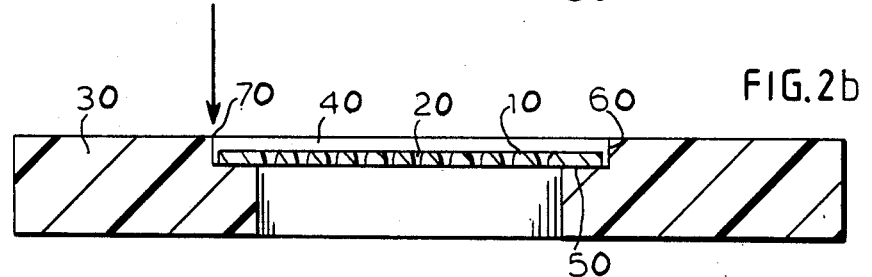
Figure 2C:
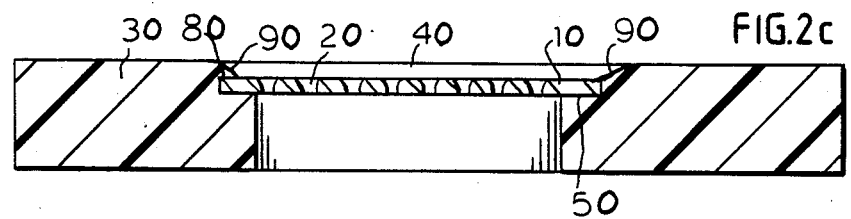

As shown in FIG. 2(a), microsieve 10 is inserted in the well 20 of a frame-like support member 30 fabricated in its entirety from a thermoplastic material such as polyethylene, polypropylene, polystyrene, polycarbonate, polyacrylate, etc. Well 20 is defined by a central bore 40 possessing a shoulder 50 and a wall 60. The width, or height, of microsieve 10 is somewhat less than the height of wall 60. In FIG. 2(b), a laser beam is directed against the upper edge 70 of the wall 60 of support member 30 causing a portion of said support member to melt and flow under the influence of gravity upon a peripheral edge 80 of microsieve 10 to form a bead-like retaining member 90 when cooled to the solidifying temperature of the polymeric substance and which secures microsieve 10 to support member 30 as shown in FIG. 2(c).

While support member 30 can be entirely fabricated from a material which fuses under the laser beam directed thereon, it is, of course, within the scope of the invention to provide a section of material applied to, or as part of, support member 30 which alone possesses this fusible quality.

It is also within the scope of this invention to continuously rotate the laser beam, or, preferably, the support member, so that a continuous bead of molten material flows upon the upper circumferential edge of the microsieve forming a correspondingly continuous retaining member. Two or more laser beams spaced equidistant from each other can be directed upon upper edge 70 of well 60 in this embodiment of the invention. Where a plurality of laser beams are employed, either they or the support member can be sequentially rotated to different sites along upper edge 70 with the result that a number of equidistant individual retaining members will be formed.

In a preferred embodiment of the invention, microsieve 10 is inserted in the well 20 of support member 30 by a manipulating device which employs a vacuum to retain a single microsieve 10 to itself until positioned immediately over said well whereupon release of the vacuum permits the microsieve to gently fall in place.

What is claimed is:

1. A method for securing a metallic microsieve to a support member which comprises:
   loosely positioning the metallic microsieve on a shoulder formed within the well of a frame-like support member, at least a portion of the upper edge of the well being fabricated from a fusible material and the height of the well above the shoulder being greater than the thickness of the microsieve; and
   directing a laser beam against a location on the upper edge of the well to cause the fusible material thereat to melt sufficiently to create a gravity-induced downflow of such material onto a peripheral edge portion of the microsieve as a deposit thereon, the deposit of fusible material when solidified forming a retaining member which secures the microsieve to the support member.

2. The method of claim 1 wherein a single laser beam is employed.

3. The method of claim 2 wherein, following the solidification of the initial fusible material deposit, the microsieve-containing support member is moved to at least one further positioning thereof relative to the laser beam in which the laser beam is directed against a different location on the well upper edge for producing at least one further securement deposit of fusible material on the microsieve.

4. The method of claim 2 wherein, following the solidification of the initial fusible material deposit the support is moved in a further Positioning path thereof relative to the laser beam to expose the edge of the well to the laser beam in a manner to form a continuous bead of molten material deposit which solidifies into a correspondingly continuous microsieve retaining member.

5. The method of claim 2 wherein, the laser beam is sequentially rotated to different sites along the upper edge of the well, with the result that a number of equidistant individual retaining members will be formed.

6. The method of claim 2 wherein, the support member is sequentially rotated to different sites along the upper edge of the well, with the result that a number of equidistant individual retaining members will be formed.

7. The method of claim 1 wherein at least two laser beams are employed to simultaneously melt different sites along the edge of the well of the support member.

8. The method of claim 7 wherein the support is continuously rotated to expose a new portion of the edge of the well to the laser beam thus forming a continuous bead of molten material which solidifies into a correspondingly continuous microsieve retaining member.

9. The method of claim 7 wherein, the laser beams are sequentially rotated to different sites along the upper edge of the well, with the result that a number of equidistant individual retaining members will be formed.

10. The method of claim 7 wherein, the support member is sequentially rotated to different sites along the upper edge of the well, with the result that a number of equidistant individual retaining members will be formed.

11. The method of claim 1 wherein the metallic microsieve is inserted on the well shoulder with a vacuum-operated positioning device.

12. The method of claim 1 wherein a part or all of the upper edge of the well defined within the support is fabricated from fusible material, the remainder of the support being fabricated from material which is non-fusible under the conditions of the method.

13. The method of claim 12 wherein the fusible material is a thermoplastic.

14. The method of claim 13 wherein the thermoplastic is polyethylene, polypropylene, polystyrene, polycarbonate or polyacrylate.

15. The method of claim 1 wherein the support in its entirety is fabricated from a fusible material.

16. The method of claim 15 wherein the fusible material is a thermoplastic.

17. The method of claim 16 wherein the thermoplastic is polyethylene, polypropylene, polystyrene, polycarbonate or polyacrylate.

* * * * *